United States Patent

[11] 3,617,120

| [72] | Inventor | Stephen Roka |
| | | 30 Goshen Court, Gaithersburg, Md. 20760 |
| [21] | Appl. No. | 829,262 |
| [22] | Filed | June 2, 1969 |
| [45] | Patented | Nov. 2, 1971 |

[54] FINGERPRINT COMPARISON APPARATUS
3 Claims, 5 Drawing Figs.

| [52] | U.S. Cl. | 353/28, 95/1.1, 356/166 |
| [51] | Int. Cl. | G03b 21/26 |
| [50] | Field of Search | 95/1.1; 353/28, 29; 356/166, 168 |

[56] References Cited

UNITED STATES PATENTS

| 2,287,678 | 6/1942 | Godwin | 356/166 X |
| 3,376,782 | 4/1968 | Whitley | 353/94 X |
| 3,482,498 | 12/1969 | Becker | 355/40 X |

Primary Examiner—John M. Horan
Attorney—Schrivener, Parker, Scrivener and Clarke ABSTRACT: A device for verifying the identity of a person presenting a credit card or other document bearing a fingerprint, comprising a means for presenting in juxtaposed relation a view of the printed fingerprint and a view of the corresponding finger of the person, thereby permitting quick comparison. Photographic means may be optionally provided for recording each fingerprint or actual finger or both.

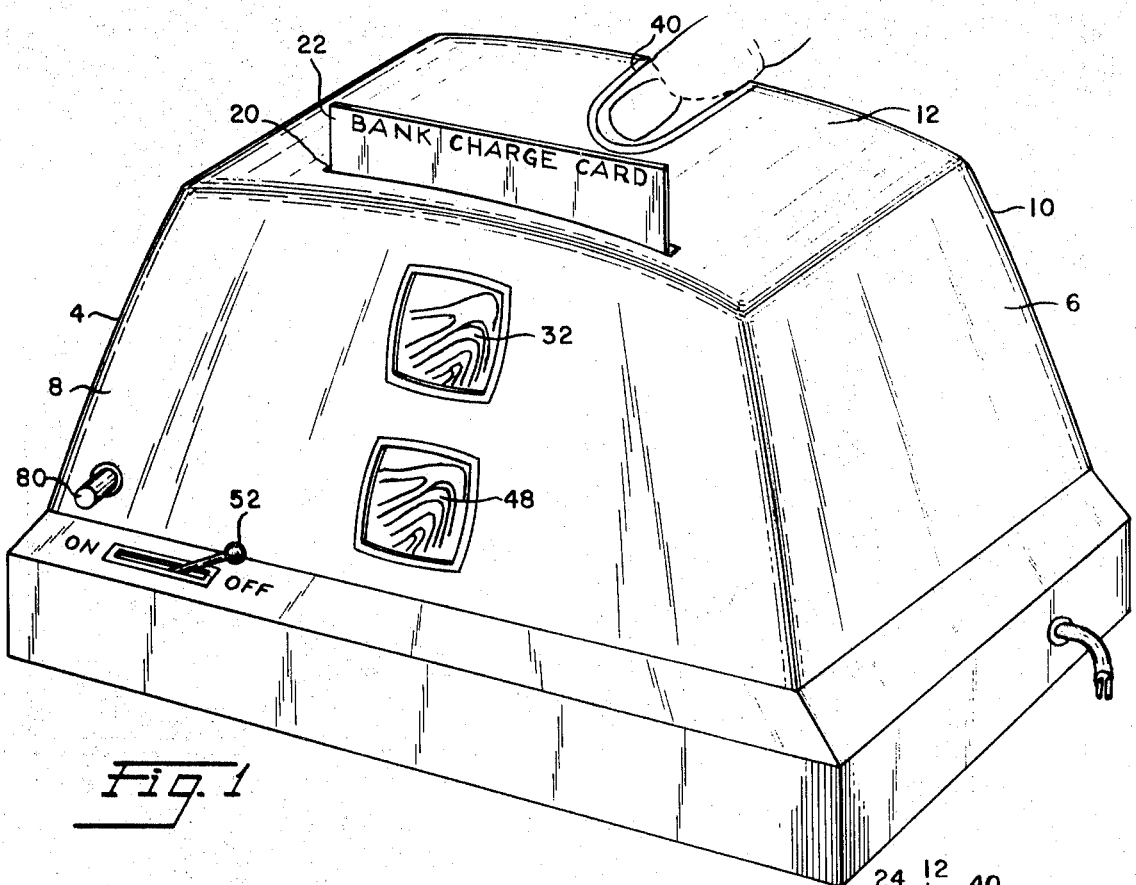
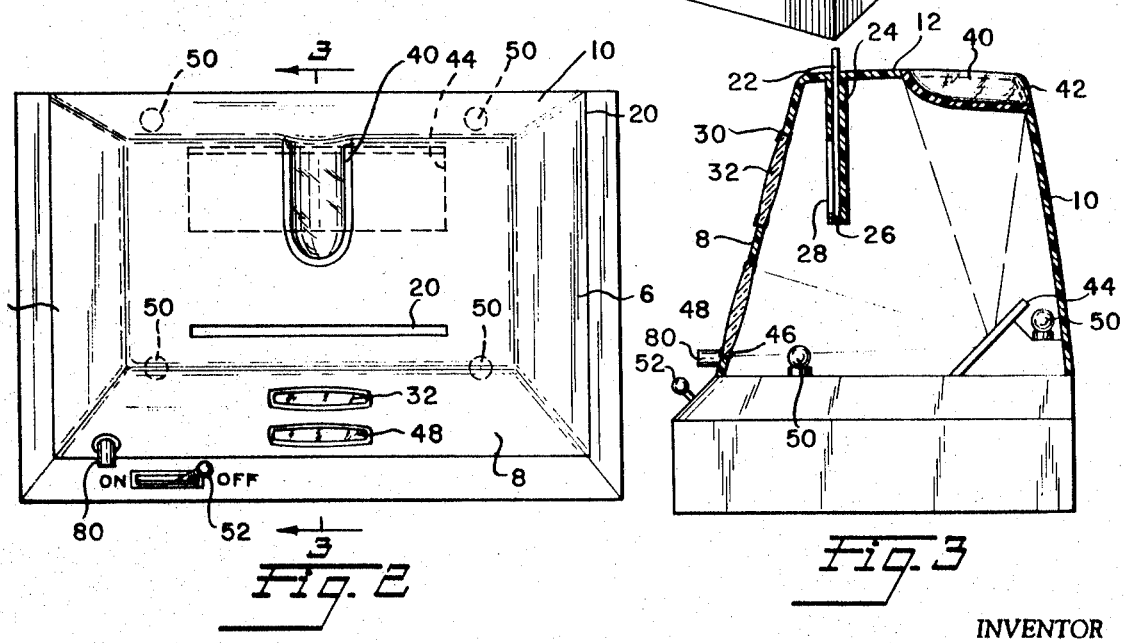

INVENTOR
STEPHEN ROKA

FINGERPRINT COMPARISON APPARATUS

DESCRIPTION OF THE DRAWINGS

FIG. 1 is a perspective view of the device provided by the invention;

FIG. 2 is a top view of the device;

FIG. 3 is a partial cross-sectional view taken on line 3—3 of FIG. 2;

DESCRIPTION OF THE INVENTION

Figure 4:
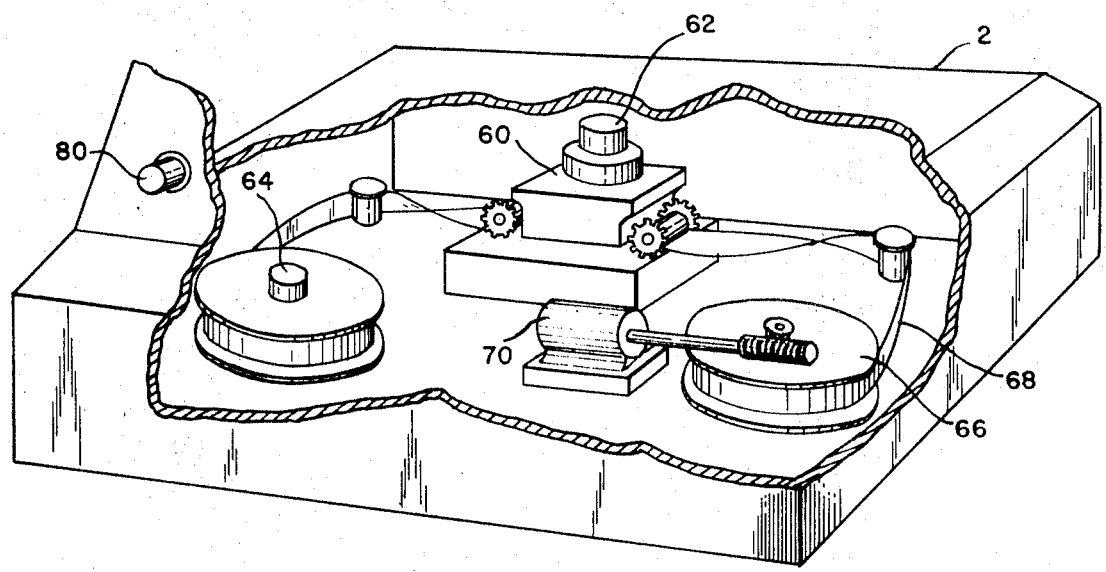
FIG. 4 is a perspective view, with parts broken away, of the base part of a modified form of the invention.

In modern merchandising the use of credit cards has become almost universal and will become so to an even greater extent upon installation of the proposed system of automatic deduction from the customer's bank account upon purchase. One of the principal problems involved in the present and proposed credit systems is the identification of the customer with the credit card which he presents, it being fully recognized by all concerned that the problem of fraud is one of the most important of the many problems to be solved both now and in the future in order to make the present and future credit systems fully acceptable and reliable.

It has been proposed that credit cards and other credit documents have printed thereon one or more fingerprints of the person to whom the card is issued, and it will be apparent that if this is done an important requirement will be the provision of means to compare the printed fingerprint with the actual finger of the person presenting the card for credit. It has been the principal object of my invention to provide means for making a quick visual comparison of a printed fingerprint, for example one printed on a credit card, with the actual finger of the person presenting the card.

The device provided by my invention for permitting such a visual comparison is illustrated in FIGS. 1, 2 and 3 of the drawings and comprises a hollow body having a bottom section 2, upwardly extending end walls 4, 6, front and rear walls 8, 10, and upper surface 12. The four walls may converge upwardly from the bottom section and the upper surface may be curved, all to provide a device of pleasing and ornamental appearance which may be placed on a counter, desk or elsewhere where it may be required.

Means are provided by the invention for receiving and supporting within the body of the device a credit card or other document having a fingerprint printed thereon, and for viewing the same from the outside of the device. Such means comprise a slot 20 which is preferably formed in the top wall 12, extending parallel to and adjacent the front wall 8 and being of such dimensions that it will freely receive a credit card 22. Below this slot and within the hollow body of the device is a supporting means 24 which is so positioned and constructed that when a credit card is inserted into the slot and dropped into the body of the device it will be supported therein with a part of the card protruding above the upper surface of the 12 in order to permit easy removal of the card. The supporting device has a bottom flange 26 on which the card rests, and its side facing the inside of front wall 8 is cut away, as shown at 28, to expose at least that part of the card on which the fingerprint is printed. In the front wall 8 there is provided an opening 30 which is aligned with the supporting means 24 and within this opening there is positioned a lens 32 through which the card, or the part thereof on which a fingerprint is printed, may be viewed. The lens may, if desired, provide a magnified view of the visible part of the card.

Means are also provided by the invention for viewing the actual finger of the person presenting the card in order to permit comparison with the fingerprint on the card. Such means comprise, first, a depression 40 which is formed in the top wall 12 of the device adjacent the rear wall 10 and extending from the rear wall toward the front wall 8 and having the general shape of a finger. The lower wall 42 of this depression is formed of transparent material in distinction to the opaque material from which the walls and top of the device are preferably formed. Beneath the transparent wall 42 and preferably positioned on or adjacent the bottom 1 of the device is an inclined mirror 44 which is so constructed and arranged that it will receive light rays from a light source 50 and will reflect these from the transparent lower wall 42 of finger depression 40 toward the front wall 8. That wall is provided with a second opening 46 which is positioned adjacent the opening 30 and within this second opening there is provided a lens 48 which, if desired, may provide magnification. The light source 50 illuminates the interior of the device so that both the card and the finger held within the depression 40 may be seen clearly through the windows or lenses 32, 48, and a switch 52 may be provided for controlling the light source.

In its use and operation the device may be positioned on a counter or desk with the front wall 8 and the windows 32, 48 facing the clerk or other official. A customer presents his credit card to the clerk or official, who drops it through slot 20 into the supporting device 24 where it is held in such position that the fingerprint printed on it is immediately visible through lens 32. At the same time the customer places within the depression 40 the finger from which the print has been taken, and this finger may be directly viewed through lens 48 by way of mirror 44, permitting an immediate comparison to be made of the printed fingerprint and the actual finger, resulting in identification of the customer.

In a modified form of the invention means are provided for producing a permanent record of each fingerprint printed on a credit card, or each customer's finger, or both, as they are presented for comparison and identification. Such means are disclosed in FIG. 4 of the drawings, in which there is disclosed the base part 2 of the device, the upper parts of the device not being shown. In the base part there are provided a photographic apparatus 60, the lens 62 of which may have its axis disposed vertically. A film supply reel 64 is disposed at one side of this apparatus and a film takeup reel 66 is disposed at the other side, a film 68 being led from the supply reel to the takeup reel and passing through the photographic apparatus 60 in a conventional manner. A stepping motor 70 is operatively connected to the film takeup reel 66 and will be energized to advance the film by one frame on each operation of a pushbutton-type switch 80, which also operates the camera shutter. The camera lens 62 may be oriented toward the finger depression wall 42 or toward the fingerprint on the card, or the parts may be so arranged and positioned that both the finger and the fingerprint will be simultaneously photographed.

Figure 5:
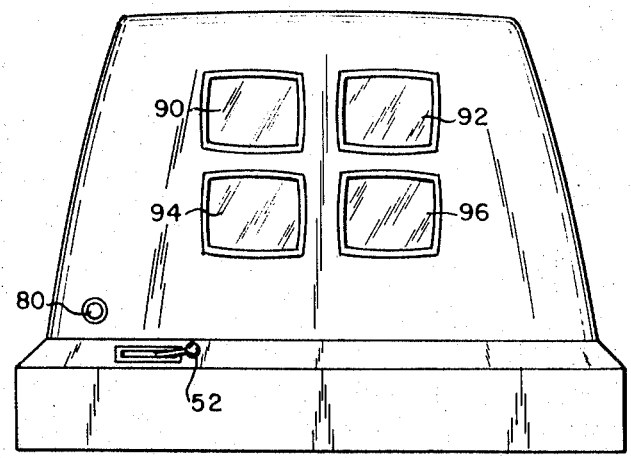
FIG. 5 is a front elevational view of a modified form of the invention.

It will be apparent that various modifications of the described apparatus may be made without departing in any way from the spirit or scope of the invention. For example, as shown in FIG. 5, the two windows may be arranged in side-by-side relation or two finger depressions may be provided if two fingerprints have been printed on the credit card, in which case there will be four windows 90, 92, 94, 96, two of which would be used to view the two fingers and the other two of which would be used to view two fingerprints on the credit card.

I claim:

1. A device for identifying a person by simultaneous visual comparison of his actual finger with the printed image of a fingerprint, comprising a body which is substantially hollow and has means formed therein to removably receive a card or the like inserted therein on which there is an image of a fingerprint, viewing means formed in the wall of the body for permitting the fingerprint image to be directly inspected from the exterior of the body, means formed in the wall of the body to receive the actual finger of the person being identified with his fingerprint directed toward the interior of the body, a second viewing means formed in the wall of the body adjacent the viewing means for the card, means within the body for reflecting the image of the actual finger from the finger receiving means to the second viewing means for permitting simultaneous visual inspection of the actual finger and the fingerprint image on the card, and a light source within the body member.

2. A device according to claim 1, in which the means to receive a card or the like comprises a slot in the wall of the body and means within the body and adjacent the slot to support the card.

3. A device according to claim 1 in which the means within the body comprises a light source positioned to illuminate the card and the finger, and a mirror positioned to reflect light beams emanating from the source from the finger to the second window.

* * * * *